(12) United States Patent
Bauer et al.

(10) Patent No.: US 7,710,896 B2
(45) Date of Patent: May 4, 2010

(54) AD-HOC NETWORK ROUTING METRIC OPTIMIZATION

(75) Inventors: Fred Bauer, Burlingame, CA (US); Peter Cnudde, Sunnyvale, CA (US); Lee Yang, Campbell, CA (US)

(73) Assignee: SRI International, Menlo Park, CA (US)

( * ) Notice: Subject to any disclaimer, the term of this patent is extended or adjusted under 35 U.S.C. 154(b) by 564 days.

(21) Appl. No.: 11/612,847

(22) Filed: Dec. 19, 2006

(65) Prior Publication Data

US 2007/0140129 A1    Jun. 21, 2007

Related U.S. Application Data

(60) Provisional application No. 60/753,018, filed on Dec. 21, 2005.

(51) Int. Cl.
*H04L 1/00* (2006.01)
(52) U.S. Cl. .................................................... 370/253
(58) Field of Classification Search ................ 370/238, 370/253
See application file for complete search history.

(56) References Cited

U.S. PATENT DOCUMENTS

| | | | |
|---|---|---|---|
| 6,795,399 B1 | 9/2004 | Benmohamed et al. | |
| 2002/0089984 A1* | 7/2002 | Jiang | 370/394 |
| 2003/0156543 A1* | 8/2003 | Sahinoglu et al. | 370/238 |
| 2003/0202468 A1* | 10/2003 | Cain et al. | 370/229 |
| 2003/0232625 A1* | 12/2003 | Bhushan et al. | 455/509 |
| 2004/0028018 A1 | 2/2004 | Cain | |
| 2004/0071096 A1* | 4/2004 | Na et al. | 370/252 |
| 2004/0111541 A1* | 6/2004 | Meyer et al. | 710/52 |
| 2005/0208949 A1 | 9/2005 | Chiueh | |
| 2006/0069842 A1* | 3/2006 | Meier | 710/316 |
| 2006/0072583 A1* | 4/2006 | Sanda et al. | 370/395.53 |
| 2007/0197222 A1* | 8/2007 | Rune | 455/436 |
| 2008/0049771 A1* | 2/2008 | Acharya et al. | 370/408 |

OTHER PUBLICATIONS

De Couto, Douglas S., et al., "A High-Throughput Path Metric for Multi-Hop Wireless Rooting", MobiCom '03, Sep. 14-19, 2003, San Diego, California, 13 pages.

Ogier, R., et al., Topology Dissemination Based on Reverse-Path Forwarding (TBRPF), RFC 3684, Feb. 2004, 46 pages.

Microsoft Corporation, "An explanation of the Automatic Metric feature for Internet Protocol routes", Article ID 299540, Last Review May 16, 2005, 2 pages.

Mockapetris, P., "Domain Names—Implementation and Specification", RFC 1035, Nov. 1987, 55 pages.

(Continued)

*Primary Examiner*—Derrick W Ferris
*Assistant Examiner*—Omar Ghowrwal
(74) *Attorney, Agent, or Firm*—Marger Johnson & McCollom, P.C.

(57) ABSTRACT

A network processing device calculates variable link metrics and then prioritizes selection of network links for sending packets according to the calculated variable link metrics. The variable link metrics can include a link capacity index that represents a combination of platform and interface capabilities for nodes on opposite ends of the network links. The link metrics can also include an expected retransmission value that indicates the percentage of packets that may have to be transmitted over different links.

8 Claims, 5 Drawing Sheets

OTHER PUBLICATIONS

Mills, David L., "Network Time Protocol (Version 3)—Specification, Implementation and Analysis", RFC 1305, Mar. 1992, 113 pages.

Droms, R., "Dynamic Host Configuration Protocol", RFC 2131, Mar. 1997, 45 pages.

Clausen, T., et al., "Optimized Link State Routing Protocol (OSLR)", RFC 3626, Oct. 2003, 75 pages.

GuideWorks, "Registry Guide for Windows", Part of the WinGuides Network, last modified Jul. 19, 2002, 1 page.

* cited by examiner

LCI AS A FUNCTION OF LCIa AND LCIb

FIG.3

ETX: EXPECTED NUMBER OF RETRANSMISSIONS

AD-HOC NETWORK ROUTING METRIC OPTIMIZATION

PRIORITY

This application claims priority from co-pending provisional patent application Ser. No. 60/753,018 entitled: AD-HOC ROUTING METRIC OPTIMIZATION BASED ON CROSS-LAYER INFORMATION, filed Dec. 21, 2005 which is herein incorporated by reference in its entirety.

BACKGROUND

Mesh networks provide continuous connections and reconfiguration around broken or blocked paths by "hopping" from node to node until the destination is reached. Mobile Ad-Hoc NETworking (MANET) is featured in many devices and is a subsection of mesh networking. Mesh ad-hoc networks are self-healing and very reliable since the mesh network can still operate even when a node breaks down or a connection goes bad.

The mesh concept is applicable to wireless networks, wired networks, and software interaction. Mesh networks use inexpensive peer network nodes to supply back haul services to other nodes in the same network. The network is extended by sharing access to higher cost network infrastructure through generally mobile nodes that are dynamically reconfigurable to connect to each other via multiple hops.

Ad-hoc routing protocols are used in these mobile wireless networks. Traditionally, each link is assigned a unit metric, which is a reasonable approximation in wired networks. However, in wireless mesh networks, link capacity, delay, bit error rate, and so forth can vary widely and dynamically. For example, a particular wireless link between two nodes may currently provide a fast reliable path for forwarding packets. However, a short time later the same wireless link may no longer provide the optimal path. For example, the wireless connection could be jammed by another signal, one of the nodes for the link could move into a location where transmitting or receiving wireless signals is difficult, or other devices may start exchanging information with one of the nodes, slowing down transmit rates.

Thus, using a unit metric and choosing routing paths based on minimum hop counts may not necessarily provide the best way for transporting packets over a mesh network. The present embodiments address this and other problems.

SUMMARY OF THE INVENTION

A network processing device calculates variable link metrics and then prioritizes selection of network links for sending packets according to the calculated variable link metrics. The variable link metrics can include a link capacity index that represents a combination of platform and interface capabilities for nodes on opposite ends of the network links, The link metrics can also include an expected retransmission value that indicates the percentage of packets that may have to be transmitted over different links.

The foregoing and other objects, features and advantages of the invention will become more readily apparent from the following detailed description of a preferred embodiment of the invention which proceeds with reference to the accompanying drawings.

DETAILED DESCRIPTION

Figure 1:
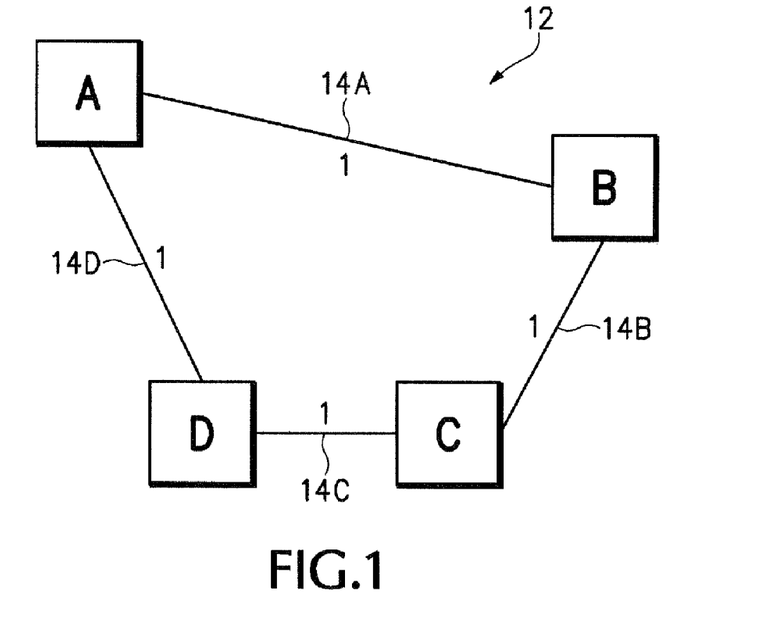
FIG. 1 shows a network that uses unit link metrics.

FIG. 1 explains how a traditional network 12 uses unit metrics to route packets. Each of the devices or nodes A, B, C, and D represent any wired or wireless computing system that either sends, receives, and/or forwards packets. For example, any of devices A-D can be a Personal Digital Assistant (PDA), Personal Computer (PC), cellular telephone, text messaging device, web server, pager, or any another wireless computing system.

Traditionally, each link 14A-14D is assigned a unit metric value of 1, which may be a reasonable approximation in a wired Internet network. Device A may want to send packets to device B. A conventional routing algorithm that uses unit metrics may normally select path 14A since it represents the shortest path (fewest number of hops) between nodes A and B.

However, in a wireless network, the most direct path between nodes A and B may not be the best path. The better path may have the highest throughput, least delay, or any of a number of other preferred criteria. This may be true for a variety of reasons, such as interference from other wireless devices, power required to transmit long distances, and effective throughput rates at long distances.

Link Metrics

Instead of unit metrics, variable link metrics are calculated for different links according to observable link characteristics such as hardware capability and link reliability. These link characteristics are combined into a single link metric and then used by individual nodes to select paths for sending or forwarding packets.

Referring to FIG. 2, again assume node A needs to send packets to node B. As described in FIG. 1, routing algorithms using unit metrics would normally choose the path 14A since it requires only one hop. The variable link metric routing scheme assigns different Empirically Computed Link Weights (ECLW) values to individual links according to different observable link characteristics. In this example, a lower ECLW value represents a higher priority link for transporting data. Link 14A has an ECLW value of 6 and links 14B, 14C, and 14D have ECI,W values of 2, 1, and 2, respectively.

Figure 2:
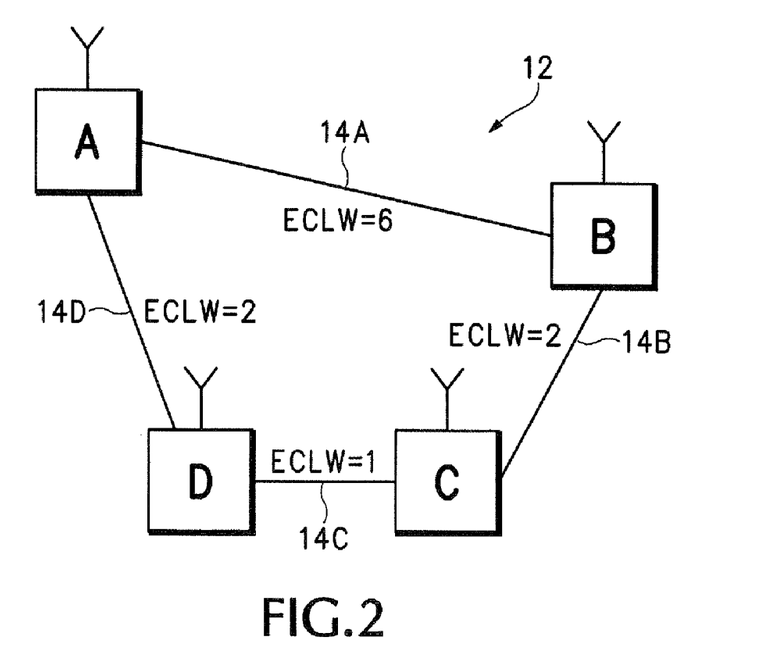
FIG. 2 shows a network that uses variable link metrics.

Link 14A could have a relatively larger ECLW value due to any number of hardware or environmental conditions such as the equipment used in both nodes A and B, or the distance between or physical locations of nodes A and B. The combined ECLW value of 5 for links 14B, 14C, and 14D is less than the ECLW value of 6 for link 14A. Accordingly, sending information between nodes A and B over path 14B-14C-14D is more preferable than sending the same information directly between nodes A and B over path 14A.

Example embodiments below describe how to compute the ECLW link metrics for routing purposes in multi-hop mobile ad-hoc networks in which network conditions are highly dynamic. However, it should be understood that the ECLW link metrics described below can be used for making routing or switching decisions in any wired or wireless network.

Routing Metric Compatibility

Ad-hoc devices operate in a variety of Internet Protocol (IP) environments and thus routing metrics calculated for such links can be generated to conform with the same conventions used elsewhere. The link metrics described below are adapted to conform with Microsoft's Windows XP's Automatic Metric Feature. However, it should be understood that the specific values derived below for the different variable link metrics can be scaled or adapted to work in conjunction with other routing parameters used in other portions of the overall Wide Area Network (WAN).

Table 1 shows the routing metrics currently used in the Windows Automatic Metric Feature for network interfaces of varying speeds.

TABLE 1

Link Speed vs. Routing Metric

| Link Speed | Metric |
| --- | --- |
| Greater than 200 Mb | 10 |
| Greater than 20 Mb, and less than or equal to 200 Mb | 20 |
| Greater than 4 Mb, and less than or equal to 20 Mb | 30 |
| Greater than 500 kilobits (Kb), and less than or equal to 4 Mb | 40 |
| Less than or equal to 500 Kb | 50 |

The variable link metrics can be adapted to the same routing metric conventions shown in Table 1 to reduce confusion and erroneous routing. This allows the variable link metrics described below to conform to preexisting routing metrics in the range of 0 . . . 50. That is, a wireless interface of link speed 11 Million Bits per Second (Mbs) will have a link metric value in the range of 21 . . . 30. It should also be noted that the variable link metrics described below can also have a finer resolution that the gradations shown in Table 1. Generating variable link metric values between values of 20-30 allow finer, more precise selection of appropriate routing paths.

Variable Link Metric Calculation

In one embodiment, the variable link metric uses Empirically Computed Link Weights (ECLW) for assisting a node in route selection. The ECLW is determined as follows.

$$ECLW = LCI + (ETX\ MIN\ 10) \quad (1)$$

LCI is a base metric called Link Capacity Index and represents a combination of platform and interface capabilities. ETX represents an anticipated number of retransmissions necessary to send unacknowledged packets across a link. The calculation of each term is described below.

Link Capacity Index (LCI)

The Link Capacity Index (LCI) takes into account hardware features of the nodes connected on opposite ends of the link. For example, the LCI takes into account the type of platform, memory, Central Processing Unit (CPU) speed, battery life, etc., of the link nodes and may be a symmetric value associated with both ends of a particular link.

$$LCI = 50 * ((255 - (LCI_A * LCI_B))/255) \quad (2)$$

LCI is the negotiated link capabilities between two nodes "A" and "B" on opposite ends of a link. LCI is a single metric but captures different combinations of platform capabilities, link speed, and battery life for both node A and node B, respectively ($LCI_A$ and $LCI_B$). Priority is an integer between 0 and 50 and is calculated by combining the individual LCIi values for each end of the link as follows.

$$LCIi = k1 * platform + k2 * memory + k3 * CPU\ speed + k4 * battery + k5 * link\ speed \quad (3)$$

In one embodiment, LCIi is an integer between 0 and 15. Coefficients ki are set to match the environmental conditions of the wireless network. For example, a naive initial set of coefficients could be k1=1, k2=0, k3=0, k4=0, k5=1. These simple coefficients empha primary factors of link speed and platform type. Of course in other network environments, any other combination of LCI components and associated coefficient values ki could also be used. Likewise each contribution to LCIi would preferably match the network environment. For example, Tables 2 and 3 show sample values for link speed and platform type.

Figure 3:
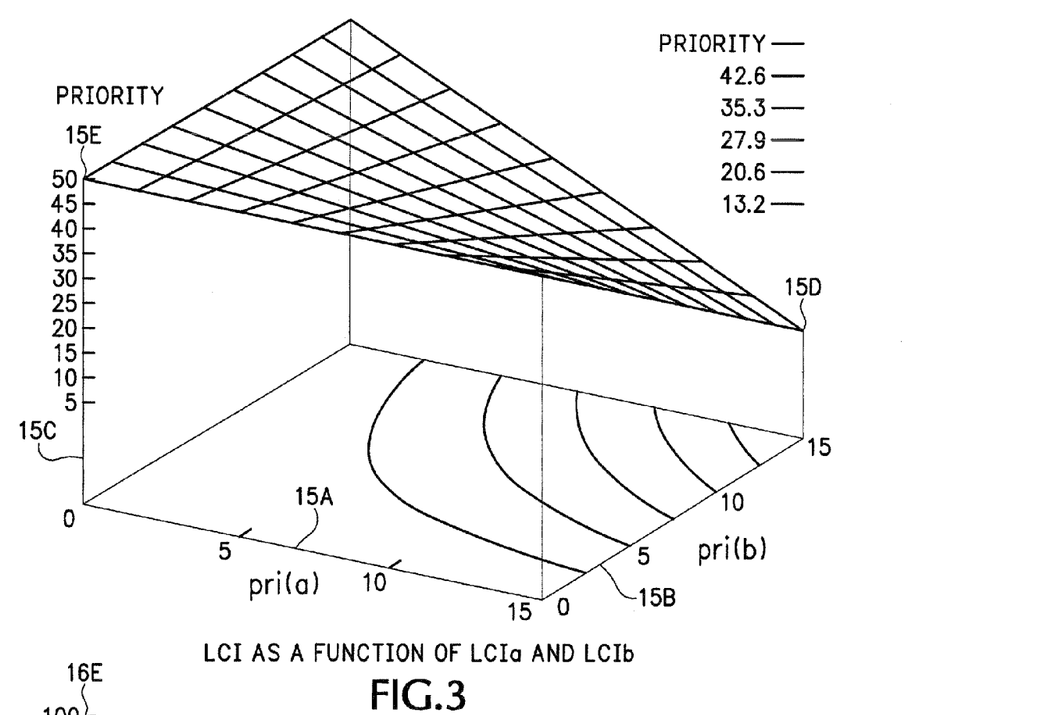
FIG. 3 is a graph showing how link priority is associated with a link capacity index.

FIG. 3 shows the LCI base metric as a function of $LCI_A$ and $LCI_B$ which are the individual values for the devices at opposite ends of an associated link. The x-axis 15A represents the strength of the first node A at one end of the link and the y-axis 15B represents the strength of the second node B at the opposite end of the same link, The z-axis 15C represents the priority (LCI) for selecting a particular link according to the combined link strength of the two nodes A and B.

Link strength refers to any of the LCI contributions listed above that indicate a physical capability of the node to reliably and quickly transmit and receive wireless data. For example, the LCI platform contribution referred to in Table 3 below represents any combination of physical features that relate to the ability of the node to conduct mesh network communications. For example, the overall architecture of a UNIX workstation may have a higher capability or capacity for data transfers than the computer architecture of a windows XP laptop.

Similarly, the LCI memory contribution may identify the capability of a node with more memory for handling more communications. The LCI battery contribution identifies the capability of a node with more battery capacity to handle more wireless communications for longer periods of time. The LCI link speed contribution as referred to in Table 3 identifies the capability of network interfaces in nodes to operate at higher communication transfer rates.

The graph in FIG. 3 shows that different combinations of communication link strengths between the two nodes A and B determines the priority of selecting that associated link for transferring packets. For example, location 15E in FIG. 3 represents two nodes with weak communication link strength. Conversely, location 15D represents two nodes that each have relatively high communication link strength. Accordingly, higher priority is assigned to links having a combined communication link strength closer to location 15D.

For example, two PDA devices may need to communicate with each other. The two PDA devices may both have relatively weak wireless communication link strengths. For example, the PDAs may have relatively low wireless transmission speeds, low memory, low battery life, and/or low CPU speeds. Accordingly, the direct point to point link between the two PDAs may have a combined LCI value near location 15E in FIG. 3.

As a result, the two PDAs may choose to send packets through one or more intermediary links that are operated by a node, such as a personal computer or network server, that has a higher Link Capacity Index (LCI). The increased LCI for the personal computer or server moves the associated link priority closer to location 15D in FIG. 3.

The priority calculations are also symmetric, meaning that the devices (nodes) at both ends of the associated link each calculate the same link priority value. If this were not the case, then the same link could have different routing metrics from the perspective of different devices.

TABLE 2

Example Link Speed Contribution to LCIi Calculation

| Link Speed | LCIi Contribution |
|---|---|
| Greater than 200 Mb | 10 |
| Greater than 20 Mb, and less than or equal to 200 Mb | 8 |
| Greater than 4 Mb, and less than or equal to 20 Mb | 6 |
| Greater than 500 kilobits (Kb), and less than or equal to 4 Mb | 4 |
| Less than or equal to 500 Kb | 0 |

TABLE 3

Example Platform Contribution to LCIi Calculation

| Platform | LCIi Contribution |
|---|---|
| Unix workstation | 5 |
| Windows XP Laptop | 4 |
| Embedded XP Tablet PC | 2 |
| Windows CE PDA | 0 |

Expected Retransmissions

Calculation of ETX is a second part of the link metric calculation. ETX is a measure of the expected ratio of expected retransmissions necessary to successfully send and receive packets, and represents the dynamic conditions of a link. ETX uses measured forward (df) and reverse (dr) delivery ratios of multicast or broadcast packets as shown in Equation 4. Multicast or broadcast packets are used since these packets are unacknowledged in 802.11 networks and thus expose packet loss across a wireless link.

The forward delivery ratio df measures how many multicast or broadcast packets a node sends that arrive successfully at a neighbor node. The reverse delivery ratio dr measures the number of multicast or broadcast packets sent by a neighbor node that successfully arrive at a local node, $$ETX = \frac{1}{df \times dr} \quad (4)$$

The ETX is adjusted to an integer between 0 and 9, to fit within the existing network metric ranges shown in Table 1 as follows. The value MIN 10 refers to a minimum value of 10.

$$ETX = \left(\left[\frac{1}{df \times dr}\right] MIN\, 10\right) - 1 \quad (5)$$

Forward and reverse delivery ratios can be measured in link-state routing protocols using hello packets. These packets are periodic, travel one hop to neighbors, and contain a sequence number. Gaps in the sequence number of hello packets are used to indicate dropped multicast packets.

The measurements using hello packets can be augmented by information obtained through a combination of active observation of existing traffic and probes involving multicast packets. This can be done by inserting additional information in each header for each multicast packet transmitted or received over a link. This additional information includes a multicast packet sequence number, similar to the hello packets. This sequence number allows further refinement of delivery packet ratios calculated and reported either through specially generated hello packets or from other packet delivery indicators that currently exist and are provided in IP networks. As was the case for link strength, the calculation of delivery ratios is symmetric, allowing both ends of the link to compute the same link metric for each link.

Figure 4:
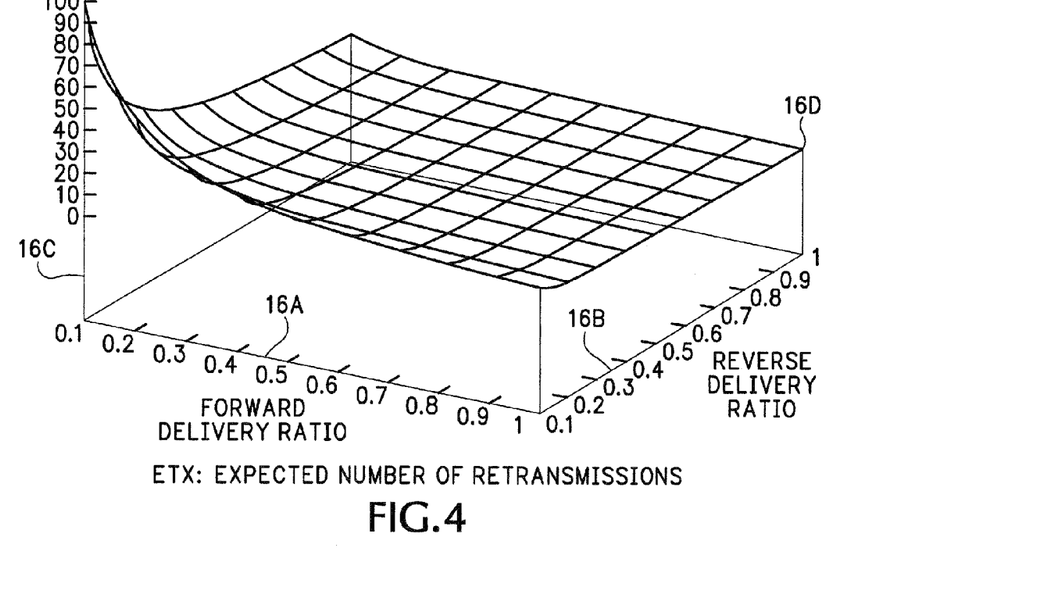
FIG. 4 is a graph showing how link priority is associated with an expected number of retransmissions.

FIG. 4 shows how link selection priority can vary according to the expected retransmission value ETX. The x-axis 16A represents the forward delivery ratio df for a particular node and the y-axis 16B represents the reverse delivery ratio dr for the node. Similar to the graph shown in FIG. 3, the combination of delivery ratios for the two nodes can determine the overall priority associated with the link. For example, two nodes with a combined good delivery ratio may have a high priority close to location 16D. Conversely, a relatively poor combined delivery ratio for the two nodes will generate a low link priority closer to location 16E in FIG. 4.

In an example, two nodes could currently be located close to each other in a noise free environment and with relatively strong combined network link capacity index (LCI). The link between these two nodes would likely have an ETX value close to location 16D. The two nodes could then move substantially further apart, one of the nodes could move into a tunnel or into a building, or another wireless signal could increase interference on the link. Any combinations of these different dynamic events could then move the ETX value for the link toward position 16E in FIG. 4. Accordingly, the priority from selecting the associated link would dynamically decrease.

Smoothing Metric Calculations

The preceding sections described how to calculate the link metric using node capabilities and measured link performance. However, links undergoing dynamic changes may create rapid changes in the calculated ECLW value. Accordingly, it may be desirable to slowly vary the link metric to reduce route flapping. Route flapping refers to a routing protocol frequently changing route destinations and oscillating between small numbers of next hops.

Route flapping is avoided by smoothing the link metric over time. For example, a simple moving average, $ECLW_d$ shown in Equation 6 can be used to smooth the link metric.

$$ECLW_d = \frac{\sum_{i+1}^{n} ECLW_{(d-i)+1}}{n} \text{ where } n \leq d \quad (6)$$

This moving average computes the average value of ECLW over the last n calculations for a time d. The n ECLW calculations are summed together for some predetermined time period d. Each new calculation n is then added to the previous $ECLW_d$ value and the oldest ECLW calculation discarded. This moving average purposely reacts slower to radical ECLW changes to prevent the link metric value from oscillating.

Figure 5:
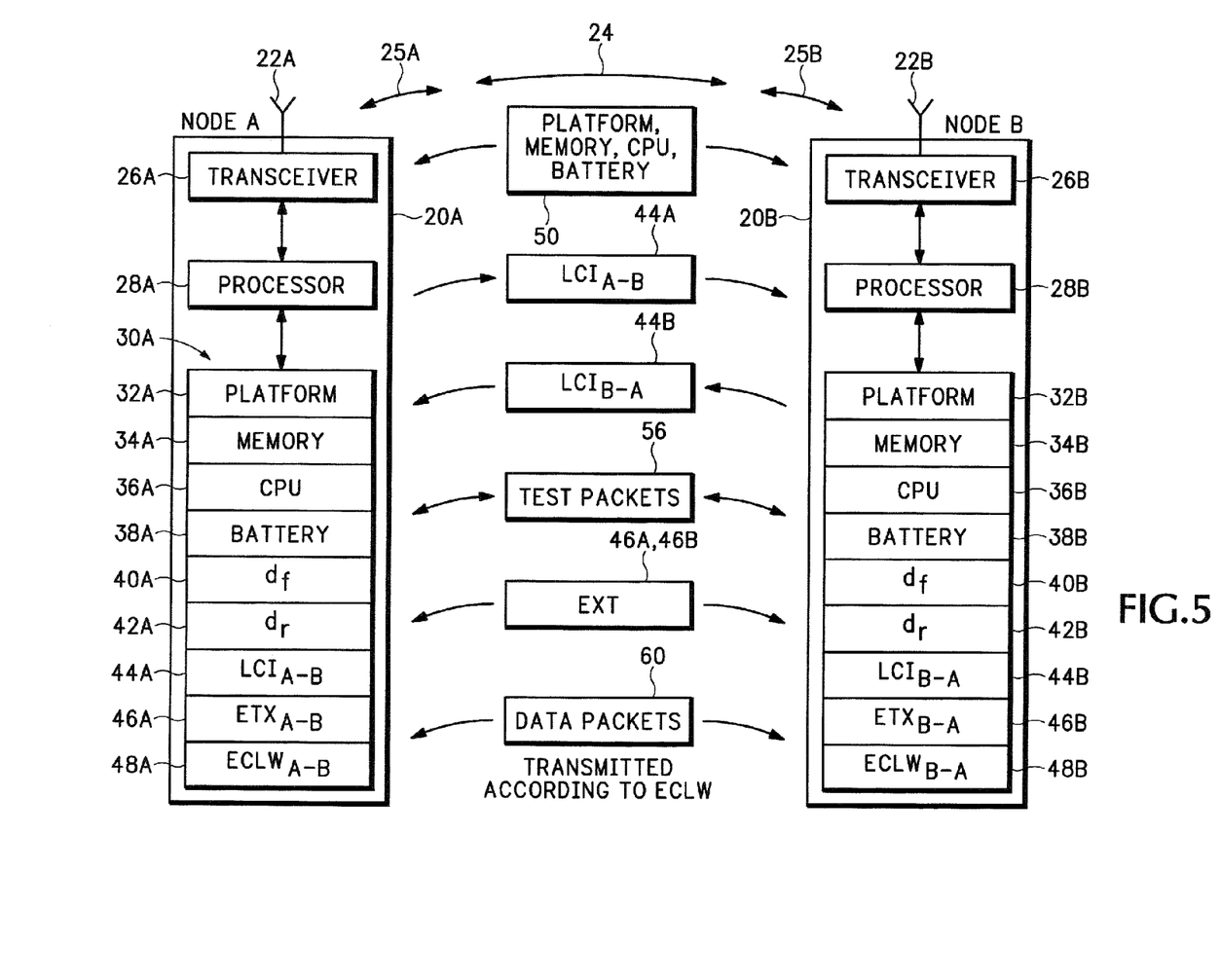
FIG. 5 is a block diagram showing how two nodes calculate Empirically Computed Link Weights (ECLW).

FIG. 5 shows in more detail how two nodes 20A and 20B in a network determine the ECLW link metric for an associated communication link 24. In this example, the two nodes 20A and 20B have the ability to communicate wirelessly via wireless radio signals 25A and 25B, respectively. However, it should be understood that ECLW link metric derived for wireless link 24 could also be used for hardwired communication links.

The nodes 20A and 20B can be any type of computing device that is capable of receiving, sending, or forwarding IP packets. For example, the nodes could be PCs, PDAs, cellular telephones, pagers, servers, routers, switches, gateways, call concentrators, text messaging devices, or any other devices. In this example, the nodes 20A and 20B each include a transceiver 26 and antenna 22 for sending and receiving radio signals 25 that contain the IP packet information. A processor 28 in each node 20A and 20B sends different information over the wireless link 24 that is then used for calculating the ECLW link metric. Each node 20 includes memory 30 that stores information 32-48 used for calculating the ECLW value for link 24.

Figure 6:
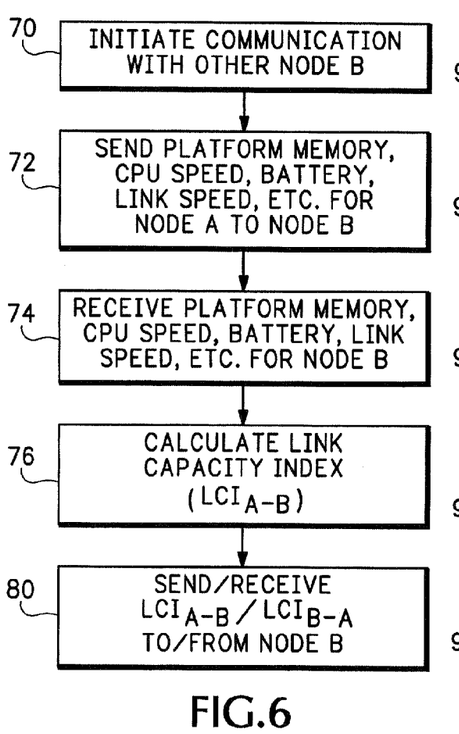
FIG. 6 is a flow diagram showing how the two nodes in FIG. 5 calculate the link capacity index used in the ECLW.

Referring both to FIGS. 5 and 6, the node 20A may initiate communication with node 20B in operation 70 of FIG. 6. In operation 72, node 20A sends link capacity information 50 for node 20A to node 20B and in operation 74 receives link capacity information 50 for node 20B. For example, memory 30A in FIG. 5 contains the local platform contribution 32A, memory contribution 34A, CPUspeed contribution 36A, and battery contribution 38A for deriving the local link capacity index $LCI_A$ for node 20A. This information may also be sent to node 20B in exchanged information 50. The same LCI contributions 32B-38B for node 20B may similarly be sent by node 20B to node 20A in information exchange 50.

Node 20A calculates the $LCI_{A-B}$ value 44A in operation 76 as described above. The $LCI_{A-B}$ value 44A (FIG. 5) calculated by node 20A in operation 76 (FIG. 6) may then be sent to node 20B in operation 80. Similarly, node 20B may send the locally calculated $LCI_{B-A}$ value 44B to node 20A in operation 80. This may be done simply to confirm each node 20A and 20B has calculated the same LCI value for link 24.

The specific types of information that are actually exchanged between nodes 20A and 20B for calculating LCI may not be exactly as shown in FIG. 5. For example, node 20A may only send over a locally calculated $LCI_A$ value to node 20B and node 20B may only send a locally calculated $LCI_B$ value over to node 20A. The two nodes 20A and 20B may then independently calculate the same symmetric $LCI_{A-B}$ and $LCI_{B-A}$ values 44A and 44B, respectively, without sending all of the individual LCI contributions in information exchange 50, Referring to both FIGS. 5 and 7, node 20A in operation 90 of FIG. 7 exchanges test packets 56 (FIG. 5) with node 20B. Node 20A in operation 92 then identifies a number of the test packets 56 successfully received by node 20B and in operation 94 identifies a number of the test packets 56 successfully received from node 20B. This is described above where the nodes 20A and 20B can track the sequence numbers for probe packets or the sequence numbers for other media packets exchanged between the two nodes.

Figure 7:
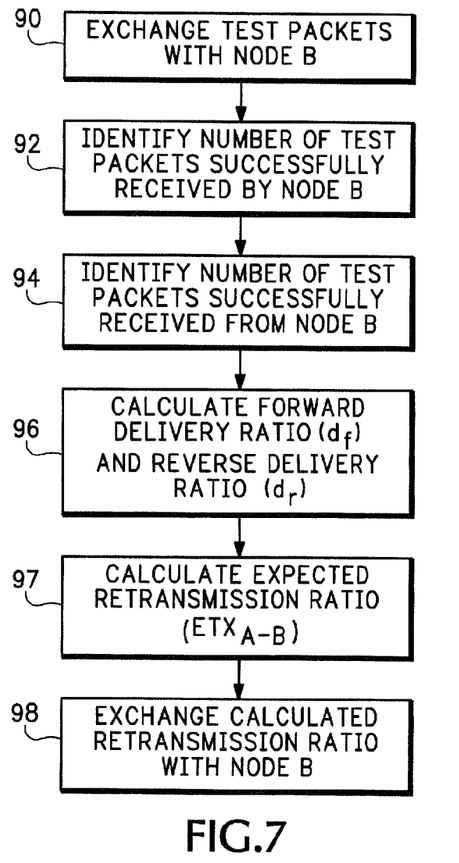
FIG. 7 is a flow diagram showing how the two nodes in FIG. 5 calculate the expected retransmission ratio used in the ECLW.

Node 20A in operation 96 calculates the forward delivery ratio df 40A and reverse delivery ratio dr 42A. The calculated df and dr ratios 40A and 40B are saved in memory 30A and used to then calculate the expected retransmission ratio ($ETX_{A-B}$) 46A in operation 97. Nodes 20A and 20B may exchange their independently calculated ETX values in operation 98 to confirm each node has derived the same values. Again, the information and test packets exchanged between nodes 20A and 20B to derive the retransmission ratio (ETX) may differ for different schemes. For example, node 20B may calculate df and send the calculated value to node 20A.

Figure 8:
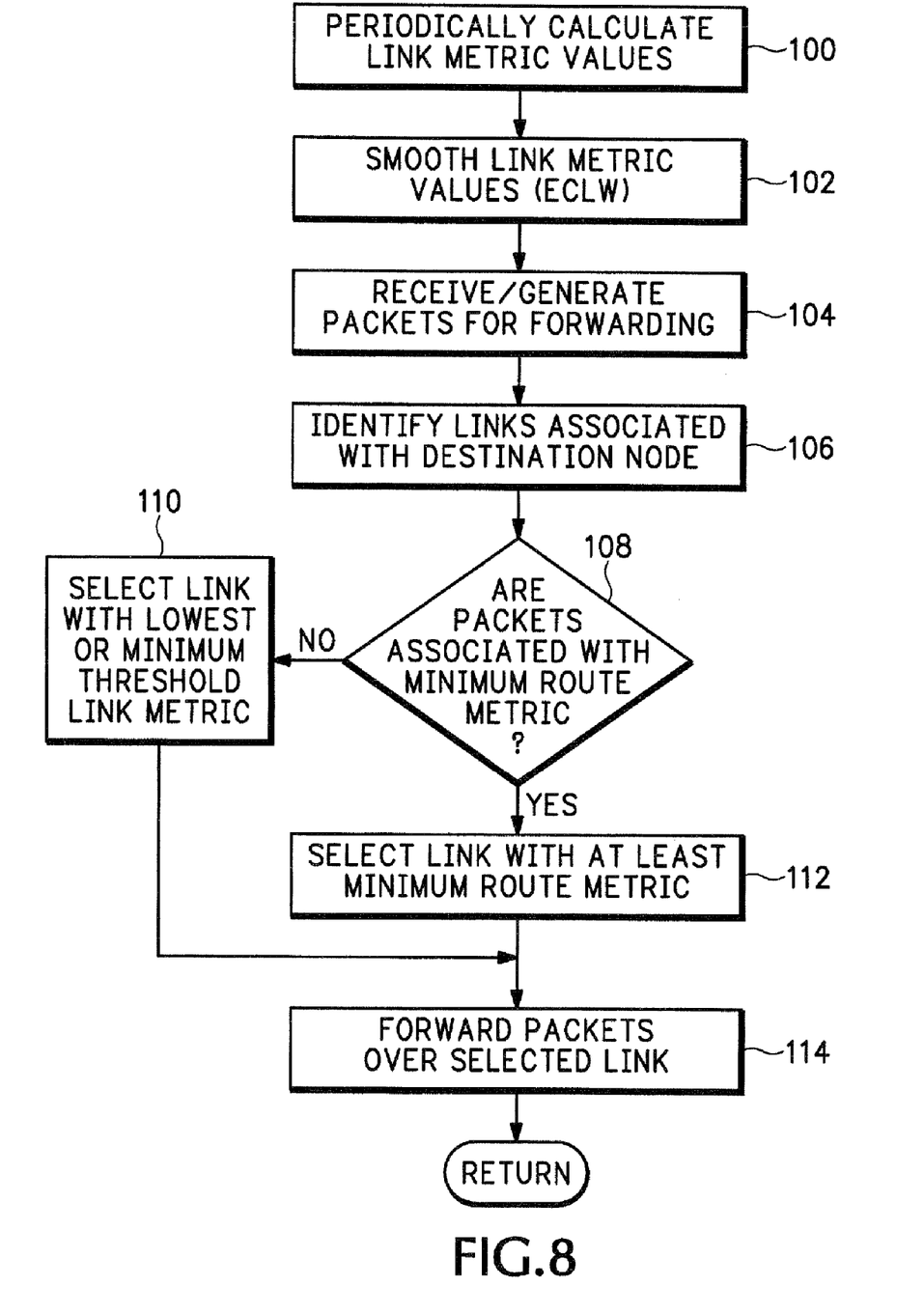
FIG. 8 is a flow diagram showing how the two nodes in FIG. 5 select links according to the calculated ECLW.

Referring to FIG. 8, node 20A in operation 100 calculates the Empirically Computed Link Weights (ECLW) value 48A using LCI and ETX as described in Equation 1. Node 20A may combine the calculated ECLW value with other previously calculated ECLW values and in operation 102 smooth the ECLW value as described above. Again, the two nodes 20A and 20B may exchange their derived ECLW values to ensure both are using the same metric for link 24.

In operation 104, the node 20A receives or generates packets 60 (FIG. 5) that need to be forwarded to a particular destination node. In operation 106, the routing engine in node 20A identifies which current links can be used for forwarding the packets 60 to the identified destination address. The node 20A then selects one of the identified links according to the associated ECLW values.

If the packets are associated with a particular minimum route metric in operation 108, the node 20A in operation 112 may select one of the identified links that has an associated ECLW value equal or less than the assigned minimum route metric. For example, as described above, other portions of the IP network may have already assigned a metric value or Quality of Service (QoS) value to the packets 60. Accordingly, node 20A in operation 112 selects a link having a ECLW value 48A within a range of the previously assigned packet metric.

If the packets 60 do not have an assigned metric in operation 108, then the node 20A in operation 110 may either select one of the identified links having a lowest ECLW value or alternatively select one of the identified links having some minimum threshold ECLW value. The packets 60 are then forwarded over the selected link in operation 114.

Link Initialization and Failure

One approach to link initialization assumes a worst possible value for all preceding samples upon initialization. Thus, the last n−1 intervals may be assumed to have the worst possible ECLW value of 50. Other middle initialization values could also be used.

Link failures can be detected by the routing protocol as part of the neighbor discovery protocol. Both nodes for the link can discover the link is lost and then both remove that link from their respective routing tables. When and if the link is reestablished, a previous smoothed value of ECLW may be recalled or, ECLW may be reinitialized to an initial lowest possible value as described above.

Alternative Applications

It should be noted that the link metrics described above are not limited to routing or to wireless mesh ad-hoc networks. Once calculated, the link metrics and their associated underlying measurements might also be used to compute Quality of Service (QoS) constrained paths for a variety of traffic types such as video, voice, or file transfer. Another possible use is for documenting the state of the network over time by recording link cost history. These stored measurements could be used, for example, in network traffic analysis or debugging of network anomalies.

CONCLUSIONS

The Empirically Computed Link Weight (ECLWi) is an integer value computed at time i and a function of factors that include LCI (e.g., platform, memory, CPU speed, etc.) and ETX (e.g., measure of link quality). The calculation of ECLW is symmetric, where the $ECLW_{A-B}$ value calculated by node A is equal to the $ECLW_{B-A}$ value calculated by node B. The simple moving average of ECLW as described above varies slowly over time to also reduce link flapping. As a consequence of these measurements, ECLW represents an improved estimate of link desirability.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method, comprising:
   sending packets to remote nodes on opposite ends of different links,
   determining a forward ratio for each of the links identifying a ratio of packets successfully received by the remote nodes;
   receiving packets from the remote nodes on the different links;
   determining a reverse ratio for each of the links identifying a ratio of packets successfully received from the remote nodes;
   generating expected retransmission ratios for the different links according to the product of the forward ratio and reverse ratio; and
   selecting the links for sending or forwarding packets according to the generated expected retransmission ratios.

2. The method according to claim 1 including:
   periodically calculating the expected retransmission ratios for the different links;
   averaging the calculated expected retransmission ratios for the different links over a predetermined time period; and
   selecting the links for sending or forwarding packets according to their averaged expected retransmission ratios.

3. The method according to claim 1 including:
   generating link capacity indexes for each of the links that represents a combination of platform capabilities for both nodes on opposite ends of the links; and
   sending or forwarding packets according to both the link capacity values and the expected retransmission indexes for the links.

4. The method according to claim 3 including:
   calculating individual link capacity indexes for both of the nodes on opposite ends of the same links;
   using the individual link capacity indexes to determine symmetric link capacity indexes used by both nodes on opposite ends of the same links; and
   selecting links for sending or forwarding packets according to their symmetric link capacity indexes.

5. The method according to claim 4 including using different combinations of a platform contribution value, a memory contribution value, a processor speed contribution value, and a wireless interface speed contribution value for calculating the individual link capacity indexes.

6. The method according to claim 5 including applying individual weighting coefficients to each of the different contribution values according to different environmental conditions associated with the links.

7. A node in an ad-hoc mesh network, comprising:
   hardware circuitry configured to:
      send packets to remote nodes on opposite ends of different links,
      determine a forward ratio for each of the links identifying a ratio of packets successfully received by the remote nodes;
   hardware circuitry configured to: receive packets from the remote nodes on the different links;
      determine a reverse ratio for each of the links identifying a ratio of packets successfully received by the remote nodes;
      generate expected retransmission ratios for the different links according to the product of the forward ratio and reverse ratio; and
      select the links for sending or forwarding packets according to the generated expected retransmission ratios.

8. A network processing device, comprising:
   a processor configured to calculate link metrics for different network links that include a link capacity index that represents a combination of platform and interface capabilities for nodes on both ends of the network links, wherein the processor generates the link capacity index according to the following:
   $LCI = 50*((255 - (LCI_A * LCI_B))/255)$; where
   $LCI_A$ is the link capacity index for the network processing device;
   $LCI_B$ is the link capacity index for a node on an opposite end of the network link;
   $LCI_A$ and $LCI_B$ = k1*PLATFORM + k2*MEMORY + k3*CPU SPEED + k4*BATTERY + k5*LINK SPEED;
   PLATFORM is a value associated with a particular type of network processing device;
   MEMORY is a value associated with an amount of memory available on the network processing device;
   CPU SPEED is a value associated with an operating speed of a Central Processing Unit (CPU) in the network processing device;
   BATTERY is a value associated with an amount of battery life available in the network processing device;
   LINK SPEED is a value associated with a transmission speed available in the network processing device for transferring data; and
   k1, k2, k3, k4, and k5 are weighting coefficients; and
   the processor generating or receiving packets and prioritizing selection of one of the network links for forwarding the packets according to the calculated link metrics.

* * * * *